United States Patent
Doemens et al.

(10) Patent No.: US 6,614,536 B1
(45) Date of Patent: Sep. 2, 2003

(54) ARRANGEMENT AND METHOD FOR SIMULTANEOUS MEASUREMENT OF THE SPEED AS WELL AS THE SURFACE SHAPE OF MOVING OBJECTS

(75) Inventors: Guenter Doemens, Holzkirchen (DE); Michael Stockmann, Bruckmuehl (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/562,373

(22) Filed: May 1, 2000

(30) Foreign Application Priority Data

Apr. 30, 1999 (DE) .......................................... 199 19 925

(51) Int. Cl.[7] .............................. G01C 3/08; G01P 3/36; G01B 11/30
(52) U.S. Cl. ......................... 356/601; 356/4.01; 356/28
(58) Field of Search ................................ 356/4.01, 601, 356/72, 28

(56) References Cited

U.S. PATENT DOCUMENTS

| | | | | |
|---|---|---|---|---|
| 3,532,886 A | * | 10/1970 | Kruger, Jr. .................. 250/393 |
| 4,433,325 A | * | 2/1984 | Tanaka et al. ............... 340/937 |
| 5,512,998 A | * | 4/1996 | Puschell ....................... 356/28 |
| 5,546,188 A | * | 8/1996 | Wangler et al. ............. 356/5.01 |
| 5,793,491 A | * | 8/1998 | Wangler et al. ............. 356/613 |
| 6,404,506 B1 | * | 6/2002 | Cheng et al. ............... 356/634 |
| 6,411,221 B2 | * | 6/2002 | Horber ........................ 340/933 |

\* cited by examiner

*Primary Examiner*—Zandra V. Smith
(74) *Attorney, Agent, or Firm*—Young & Thompson

(57) ABSTRACT

Surface shape determination and an exact speed measurement of a moving object is undertaken with an arrangement including semiconductor elements and having two spaced semiconductor sensor lines. Illumination of the moving object occurs via at least one laser diode that is arranged in the proximity of the semiconductor sensor lines. The semiconductor sensor lines are used to perform a registration of cross-sectional profiles by integrating a number of range vectors calculated from sensed reflected light pulses at times when the moving object is not present and present. Successively registered cross-sectional profiles of a vehicle are converted into cross-sectional areas and into longitudinal profiles. The speed can be identified on the basis of the time-offset between identical registration in the first and second semiconductor sensor lines. A categorization of different types of moving object is accomplished by comparing the calculated cross-sectional areas and longitudinal profiles with known object characteristics.

24 Claims, 5 Drawing Sheets

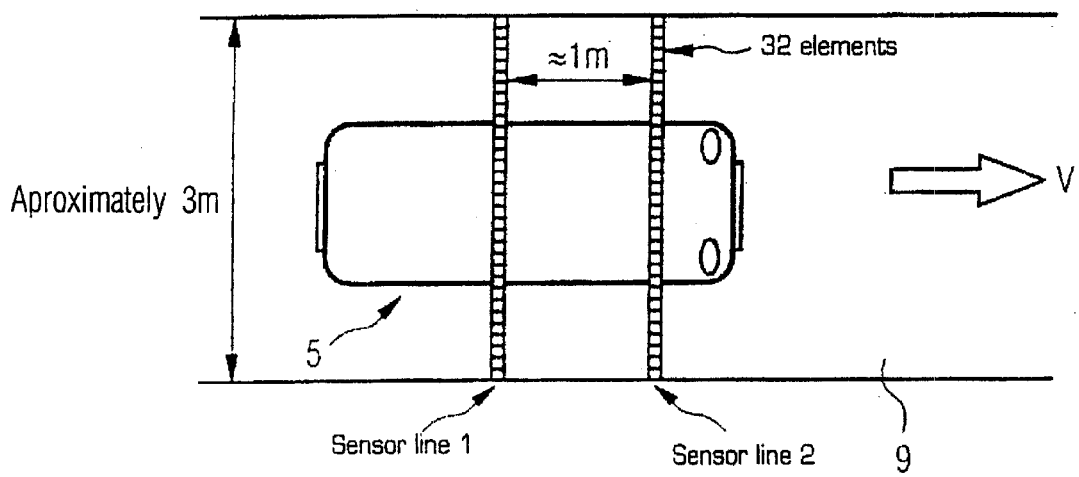
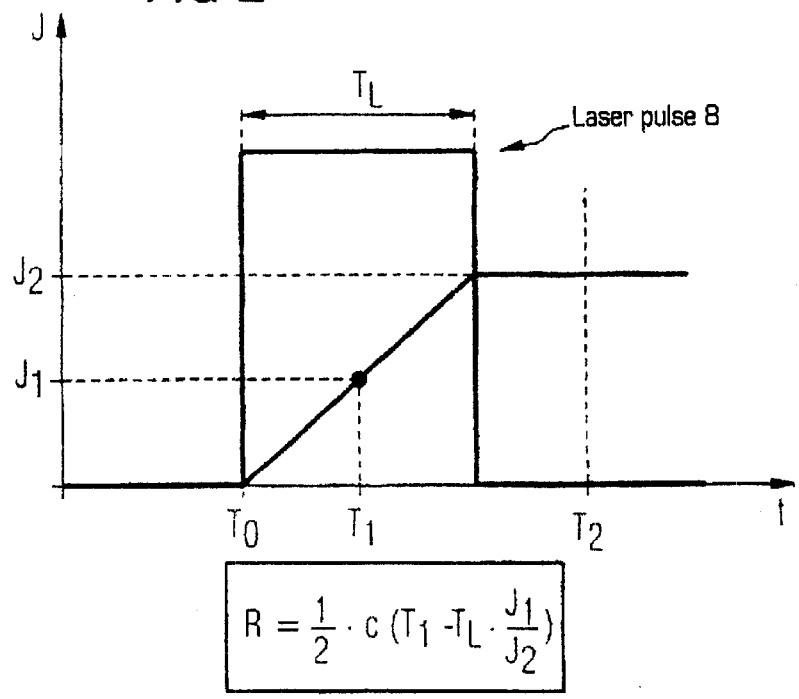

ARRANGEMENT AND METHOD FOR SIMULTANEOUS MEASUREMENT OF THE SPEED AS WELL AS THE SURFACE SHAPE OF MOVING OBJECTS

BACKGROUND OF THE INVENTION

The present invention is directed to an arrangement and method for measuring speed or geometry of moving objects with the registration of range images (highlight images) on the basis of measurements of the running time of light.

The speed of an individual object as well as the characterization of the object are necessary for automatic monitoring of vehicle traffic as well as of general material transport. In traffic monitoring, this means the exact measurement of the vehicle speed as well as, for example, distinguishing between passenger vehicles, trucks or motorcycles. In material transport with a conveyor belt, the total volume conveyed per unit time and, given a constant specific weight, the quantity (i.e., the overall weight) can both be automatically determined by constant acquisition of the speed as well as the cross-section of the conveyed material.

When only the speed of vehicles is measured, various methods are currently available such as radar or infrared systems that measure in a passive way. These systems essentially satisfy the demands that are made of them. However, it is extremely disadvantageous that measurement must be carried out in or opposite the direction of travel of the objects, and that a simultaneous characterization of the moving object can be realized only to an extremely limited extent.

A method is known wherein a range image (distance image, height image) is acquired by a CMOS image sensor having an extremely short integration time (for example 30 ns) as well as a laser pulse illumination of the object. The main employment of these methods has previously been monitoring rooms, particularly monitoring the interior of a vehicle.

SUMMARY OF THE INVENTION

The present invention is based on the need to make an arrangement and a method available for an exact speed measurement as well as an acquisition of the geometry of moving objects with a single system.

These and other needs are achieved by the present invention through an arrangement for measuring at least the speed or surface shape of moving objects, or a combination thereof, based on measurements of the travel time and intensity of light emitted from a light source and reflected back by the moving objects. The arrangement includes at least one light source configured to illuminate the moving objects with light pulses. In addition, at least two optical semiconductor sensor lines are positioned in the region of the at least one light source and are comprised of a plurality of sensor elements for sensing light emitted from the at least one light source that is reflected by the moving objects and the moving objects background across which the moving objects travel. The at least two optical semiconductor sensor lines are spaced a predetermined distance relative to one another and are disposed parallel to one another. Further, the sensor lines are arranged traverse to a travel direction of the moving objects. The arrangement further includes a controller to calculate range profiles of the moving objects based on measured travel time and intensity of light emitted from the light source and reflected back by either the moving objects or the moving object background. The controller then is able to derive a surface shape of the moving objects based on the calculated range profiles.

According to another aspect of the present invention, a method is provided to determine either the speed or surface shape of moving objects, or combination thereof, based on measurements of travel time of light emitted from a light source and reflected back by the moving objects. Included are the step of emitting at least one light pulse from the light source and then sensing light of the light pulse reflected from one of a moving object or a moving object background using at least two optical semiconductor sensor lines positioned in the region of the light source. The optical semiconductor lines are each comprised of a plurality of sensor elements. The travel time and intensity light emitted from the light source is then measured and range profiles are calculated for moving objects based on measured travel time and intensity of light that is emitted and reflected back by at least one of the moving objects or the moving object background. A first calculated range profile of the moving object background where no moving object is present is first calculated and then compared to a subsequently calculated range profile of the moving object as it travels across the moving object background. From this at least one cross-sectional profile is determined based on a difference between the first calculated range profile and at least one subsequently calculated range profile when the moving object is present.

The invention is based on the perception that the above need can be met based on the principle of producing range images or object profiles with measurements of the running time of light. To this end, two opto-electronic semiconductor sensor lines are utilized in combination with an illumination, wherein surface parts of objects are illuminated, and range images are supplied by the opto-electronic semiconductor sensor lines by evaluating the running times of light from the illumination to the object. The use of two spaced semiconductor sensor lines enables a short-time offset registration of the same surface profile or of the same location at the object, wherein, given a known distance between the sensor lines or between an illuminated stripe on a background or reference plane, the speed of the object is calculated. A plurality of cross-sectional areas of the moving object are first registered, their sequence describing the longitudinal profile of the object. A measurement of the speed and a registration of the geometry of the measured object can thus be realized overall with a single system.

For increasing the readout speed at the electrical side of the semiconductor sensor lines, it is advantageous to be able to freely select the sensor elements. As a result, a relatively slow serial readout of sensor lines is avoided. The use of CMOS technology by employing CMOS components in the semiconductor sensor lines affords an especially compact structure, wherein a particular advantage results from integrating both light lines on one semiconductor component.

When the number of sensor elements with which a semiconductor line is constructed is limited to, for example, 32, then the individual sensor elements representing the semiconductor sensor lines are of adequate size and exhibit corresponding light sensitivity. Correspondingly, the power of the illumination side can be kept low.

Over and above this, such a light-sensitive semiconductor line can be read out in an extremely short time, for example in a few microseconds. It is advantageous to design the light sources located in the proximity of the semiconductor sensor lines as modulatable laser diodes, for example laser diodes that can be frequency-modulated or amplitude-modulated. For adhering, to laser safety stipulations, for example, a plurality of light sources can be employed, these respectively partially illuminating an object. The light sources are thereby preferably serially activated, wherein partial surface regions are illuminated and correspondingly interpreted at the semiconductor sensor lines. The most advantageous arrangement of the semiconductor sensor lines relative to the objects is comprised in their perpendicular alignment relative to the travel direction of the objects given a pass above or to the side of the object. The illumination, which is arranged extremely close to the semiconductor sensor lines, illuminates a line-like region on the object background that approximately corresponds to the coverage area of the semiconductor sensor lines. The illumination and acquisition areas to be allocated to the respective sensor line are advantageously spaced one meter apart. The two areas are aligned mutually parallel corresponding to the semiconductor sensor lines. When vehicles that move on a travel lane are to be measured, then the width of the travel lane should be completely illuminated.

The structure of the semiconductor sensor lines provides resolution using individual element areas that are arranged in a line. Thus, correspondence between individual sensor elements of the semiconductor sensor line and a corresponding location in the line-like coverage area of the semiconductor line on the object background or on the object exists. When short-time integration is advantageously selected as the measuring method for the running time of light, then a specific measuring method is comprised in measuring or integrating the light received up to that point in time at the semiconductor sensor elements at two integration times, one occurring shortly after the other. In order to be able to implement the two integration times parallel in time and, thus, in order to shorten the measuring time, the individual sensor elements of the semiconductor sensor lines are redundantly designed such that an identical optical charging occurs. This is effected by a meshing of electrically sensitive, light-sensitive surfaces on one sensor element.

For determining the surface shape of vehicles, a distance profile of the background having an object located thereon is registered after the registration of a distance profile of the background. The differences between registration before and during when the object moves across the background yield a plurality of profiles of the object. The area of the cross-section can be respectively calculated from these cross-sectional profiles. The longitudinal profile of the moving object results in the sequence of cross-sectional areas. By employing two semiconductor sensor lines having a predetermined spacing from one another, both the object shape as well as the speed of the object can be identified. One particular advantage is that an object can be categorized on the basis of these data. By comparison to a respective pattern, for example, recognition can be made between whether the moving object is a matter of a person, a motorcycle, a passenger vehicle or a truck.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 1 shows a schematic plan view of a vehicle that moves in arrow direction at a speed with the coverage areas of the semiconductor sensor lines arranged according to an embodiment of the invention;

FIG. 2 shows an intensity/time diagram of a laser pulse with two short-time integrations for the distance measurement;

DETAILED DESCRIPTION OF THE PREFERRED EMBODIMENTS

Figure 3A:
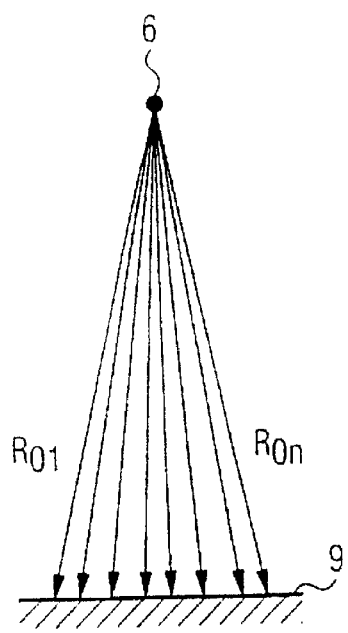
FIGS. 3A and 3B show the schematic traffic monitoring on the basis of the acquisition of the background of an object and with object, transversely relative to the travel direction.

The proposed arrangement and the corresponding method yield an exact speed measurement perpendicular to the travel direction as well as a geometry acquisition of the object or of the object surface with a single cost-beneficial and rugged system that can also be unproblemmatically attached to existing light standards in a city area due to the small dimensions and the low weight. Proceeding from the above-described principle of the invention, the combination of semiconductor sensor lines with short-time integration and illumination with laser pulses is employed. The illustration according to FIG. 1 shows two coverage areas of the semiconductor sensor lines 1 and 2 that are arranged transversely relative to the travel direction of the object, preferably perpendicular to the travel direction. Their spacing is approximately 1 m. The travel direction and the velocity V of the object 5 are indicated with an arrow. The object 5 is a vehicle that is moving on a travel lane with a width of approximately 3 m, for example. In this specific instance, the semiconductor sensor lines 1 and 2 each respectively comprise 32 sensor elements. The length of a semiconductor sensor line need not correspond to the width of the travel lane. However, the coverage area of the semiconductor sensor lines 1 and 2 must at least cover the width on the object background and, thus, on the object 5 with a corresponding, requisite imaging optics. The same is true of the illumination side, shown in FIGS. 4 and 5, wherein an imaging optics must be able to "see" to a line-like illumination area. A specific imaging optics is not shown in the figures. Rather, these are merely indicated by margin rays between light source, object area and sensor area. In another embodiment, the semiconductor sensor lines may be integrated on a semiconductor chip according to FIG. 7.

In order to assure an optimally precise speed measurement, the width of the semiconductor sensor line 1 or 2 on the travel lane plane (i.e., the background) only need be approximately 1 to 2 cm. A very limited number of sensor elements 7, (e.g., 32 sensor elements), located transversely to the travel direction suffices for the characterization of the vehicle. As a result, the light-sensitive surfaces of the individual sensor element 7 become comparatively large and, thus, the required laser power can be kept low.

The relatively low number of light-sensitive sensor elements 7 has the decisive advantage that the sensor lines 1 and 2 can be read out in an extremely short time, for example a few microseconds. The movement of an object at, for example, 100 km/h only amounts to a few millimeters in this time interval. The distance from the sensor line 1 and 2 to the surface of the street (i.e., the background) or the object is calculated from the intensities $J_1$ and $J_2$ at two different integration times $T_1$ and $T_2$ as well as from the known laser pulse duration $T_L$, by a controller associated with the sensor lines 1 and 2 (not shown). Calculating methods for calculating the distance are disclosed, for example, in German Patent Application P 198 33 207. A range vector R corresponding to the distance from the sensor line 1 or 2 and the surface of the street or the object is calculated in FIG. 2 in conformity with the following equation:

$$R = \frac{1}{2} \cdot c \left( T_1 - T_L \cdot \frac{J_1}{J_2} \right)$$

Where c represent the velocity of light.

$T_0$ thereby denotes the travel time of light that elapses until the light that is emitted and reflected from the object arrives on the sensor line. The rectangular laser pulse 8 shown in FIG. 2 is that pulse that arrives at the object or that is detected. The two intensities $J_1$ and $J_2$ are measured for the corresponding integration times $T_1$ and $T_2$.

At a specific point in time, the cross-sectional area F of an object located under the semiconductor sensor line is derived on the basis of the following relationship:

$$F = \sum_{n=1}^{n} (R_{0n} - R_n)$$

Where the values $R_{0n}$ from n=1 to n represent a profile of range vectors when a vehicle is not present and range vectors $R_n$ from n-1 to n represent a profile of range vectors when a vehicle is traveling across the background 9. The above equation sums the differences of corresponding range vectors from the merely background profile (i.e., $R_{0n}$) and the range vectors when a vehicle is present (i.e., range vectors $R_n$). That is, range vectors $R_1$ is subtracted from range vector $R_{01}$, range vector $R_2$ is subtracted from range vector $R_{02}$ and so forth. Each of these respective differences is then summed to obtain the cross-sectional area of the vehicle.

Figure 3B:
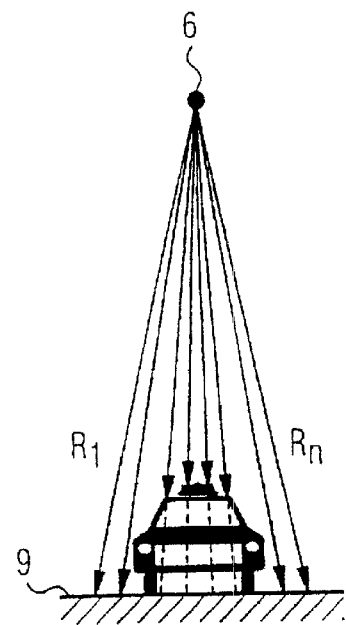

The two illustrations shown in FIGS. 3A and 3B function with a single light source 6. The respective range vectors R enter into the calculation of the cross-sectional area of a motor vehicle, for example. The registration of the background 9 is indicated in FIG. 3A, with range vectors $R_{01}$–$R_{0n}$ in contrast whereto a moving object 5, a vehicle, is present on the background 9 in FIG. 3B with range vectors $R_0$–$R_{0n'}$. These calculations are independent of the evaluation method, so that various measurements of the running time of light can be employed.

Figure 4:
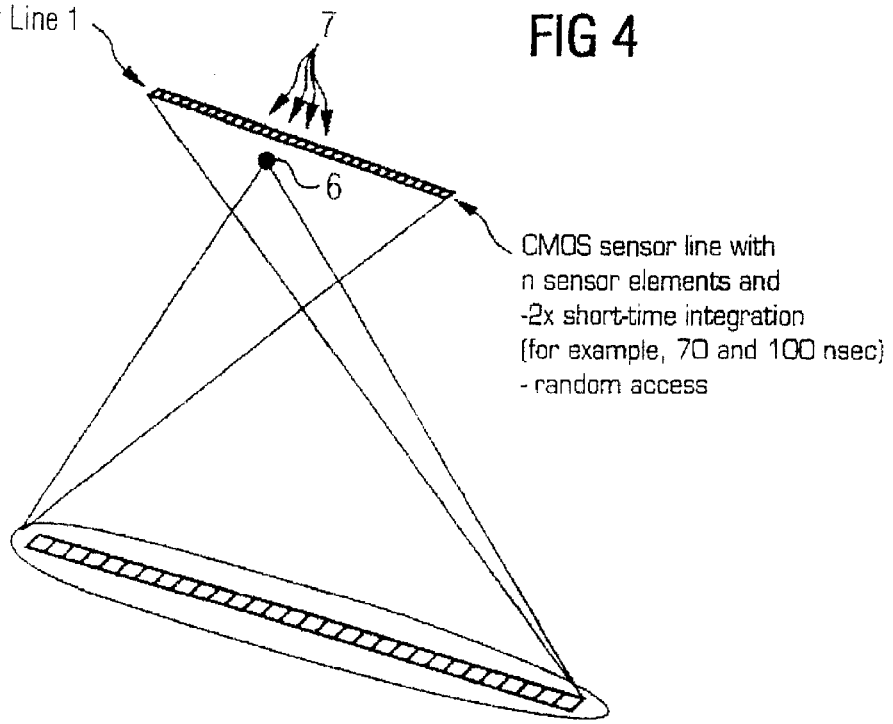
FIG. 4 schematically shows the sensor elements contained in a semiconductor sensor line and an illumination band that extends over the coverage area of the sensor line.
Figure 5:
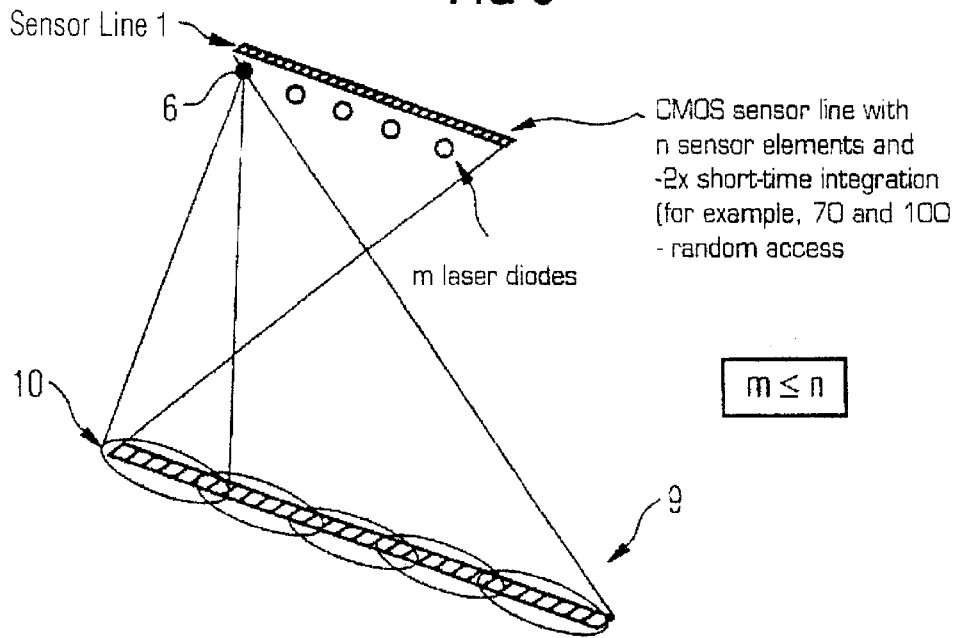
FIG. 5 shows an arrangement corresponding to FIG. 4, whereby a plurality of light sources illuminate a coverage area of the sensor line.

Optimal illumination of the object surfaces co-linearly by a pulsed laser is effected with the imaging optics for a semiconductor sensor line. In order to keep the laser power low, FIG. 4 illustrates that the object side is only illuminated along an illumination line 10, for example by employing a defractive element (not shown), as shown in FIG. 4. A further reduction of the light power of an individual pulsed laser may be achieved by employing a plurality of laser sources, each of which only partially illuminates the coverage areas of the line and each of which is successively activated as shown in FIG. 5. The readout of the respectively illuminated area from the line then occurs via a random picture element access (random access). In addition to the safety-oriented aspects, a low pulsed laser power also has the advantage of steeper leading edges and, thus, a beneficial effect on the obtainable precision of the overall system. Without exact presentation of the interposed optics, FIGS. 4 and 5 respectively show light sources 6, a sensor line 1 and a corresponding illumination line 10 on the background 9. The number of laser diodes m should be smaller than or equal to the number of sensor elements of a sensor line 1, this corresponding to the number of range vectors that can be registered. The illustration of the illumination line 10 can be clearly seen in FIG. 5 from a succession of a plurality of oval illumination spots corresponding to the m number of laser diodes.

Figure 6:
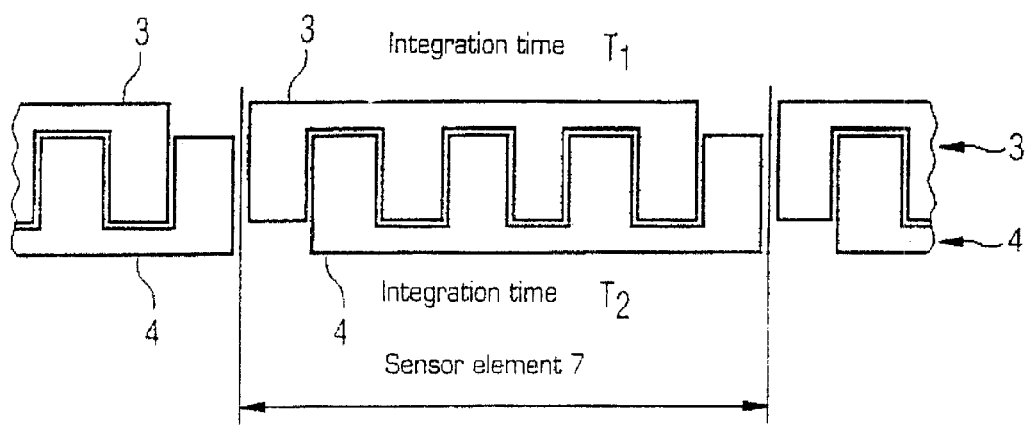
FIG. 6 shows a meshed surface structure of the electrically separate light-sensitive areas on a sensor element.

FIG. 6 shows a portion from a sensor line 1 or 2 with a complete sensor element 7 for use with short-time integration as the measuring method for the running time of light. The meshing of the sensor element halves 3 and 4 enables a parallel implementation of the two integrations with the times $T_1$ and $T_2$. Since these integrations, however, must be implemented for the same object location, the individual sensor elements 7 according to FIG. 6 are constructed of two electrically separate sensor elements 3 and 4 whose light-sensor sensitive surfaces are meshed with one another. This denotes a local incidence. Advantages involved with this construction include a further reduction of the laser energy that has to be output during a measuring event as well as a shortening of the measuring time.

Figure 7:
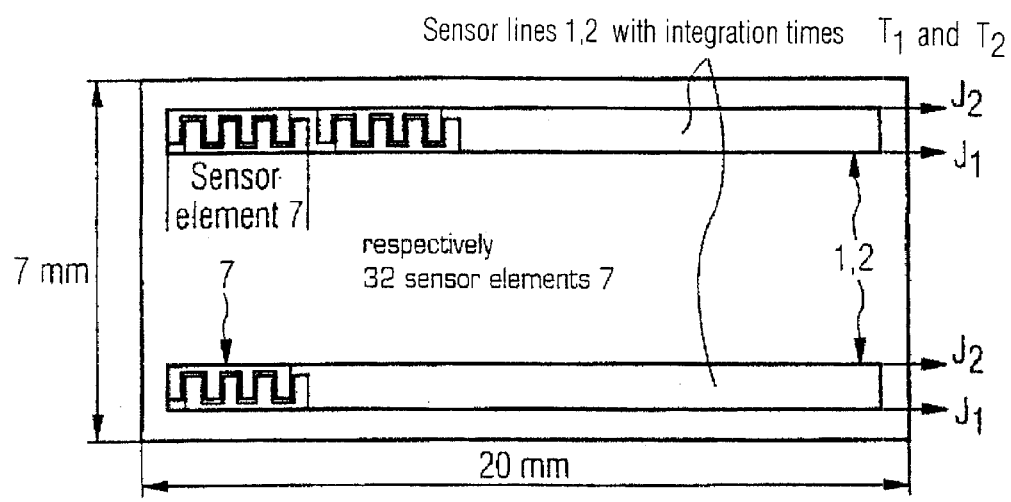
FIG. 7 shows the integration of two semiconductor sensor lines that are fashioned according to FIG. 6.

A considerable cost reduction as well as a noticeable miniaturization of the overall system derives when the two sensor lines 1 and 2 are integrated on a chip, as shown in FIG. 7. The chip has the approximate dimensions of 7×20 mm. Each sensor line 1 and 2 is composed of 32 sensor elements 7. The sensor elements 7 are in turn subdivided into two meshed regions. The intensities $J_1$ and $J_2$ can be randomly read out element-by-element for each sensor line. The imaging of the sensor line again occurs with a single optics onto the travel lane or road.

Figure 8:
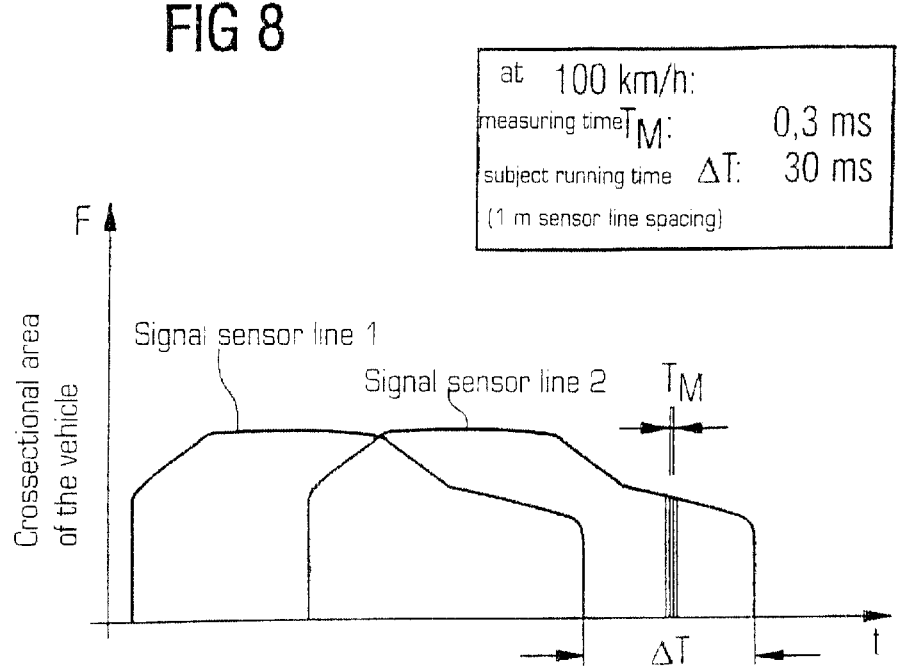
FIG. 8 shows two identified longitudinal profiles of a vehicle at different times.
Figure 9:
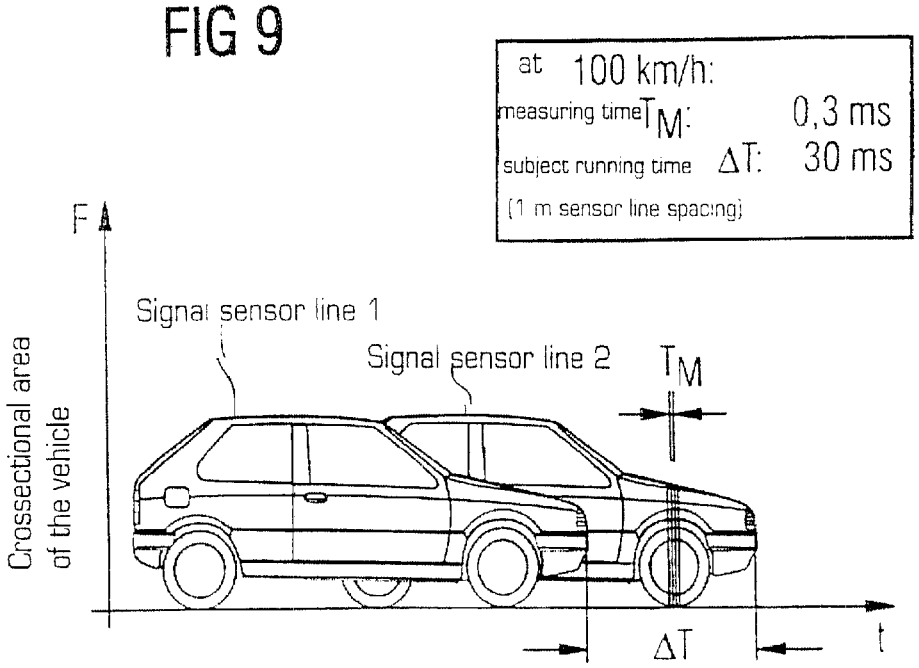
FIG. 9 shows an illustration corresponding to FIG. 8, whereby the moving objects are motor vehicles.

Joining measured cross-sectional areas yields the contour of the vehicle in the travel direction. At 100 km/h, a cross-sectional measurement always occurs at the spacing of approximately 1 cm. The coverage area of the second sensor line lying at a distance of 1 m, and that is spaced 1 m from the first illumination line 10, delivers the identical contour course with a delay ΔT proportional to the speed of the vehicle, as shown in FIGS. 8 and 9. The time delay between the two signals can be acquired simply and exactly with known methods of correlation or similar methods. The unambiguous characterization of vehicles can be accomplished from the maximum values of length, height and width that can be precisely determined from the measured longitudinal and transverse contour curves.

The arrangement and method of the present invention deliver a speed measurement perpendicular to the travel direction of moving objects with a measurement uncertainty of 1%. Employing the present invention for vehicle identification, a categorization into, for example, passenger car, truck or motorcycle can be undertaken. This occurs on the basis of the exact acquisition of length, height and width of the moving object or vehicle. The measurement can be implemented during the day or at night and is disruption-proof with respect to the influence of, for example, vehicle headlights. The system is cost-beneficial and rugged overall due to an exclusive employment of semiconductor components.

Another broad field of application for the speed measurement with simultaneous acquisition of cross-sectional profile is the automatic identification of the conveyed quantity on conveyor belts.

Non-contacting level measurement of bulk material can also be advantageously implemented with the described arrangement. In this application, for example, the sensor lines 1 and 2 are rotated by 360° or 180° around the axis of a bulk material containment silo.

While this invention has been described in connection with what is presently considered to be the most practical and preferred embodiment, it is to be understood that the invention is not limited to the disclosed embodiment, but, on the contrary, is intended to cover various modifications and equivalent arrangements included with the spirit and scope of the appended claims.

What is claimed is:

1. An arrangement for measuring at least one of a speed and a surface shape of moving objects based on measurements of travel time and intensity of light emitted from a light source and reflected by the moving objects, comprising:

at least one light source configured to illuminate moving objects with light pulses;

at least two optical semiconductor sensor lines positioned in a region of the at least one light source, the at least two optical semiconductor lines each being comprised of a plurality of sensor elements for sensing light emitted from the at least one light source that is reflected by the moving objects and a moving objects background across which the moving objects travel, the at least two optical semiconductor sensor lines being spaced a predetermined distance relative to one another and disposed parallel to one another, and arranged transverse to a travel direction of the moving objects; and a controller for calculating range profiles of the moving objects based on measured travel time and intensity of light emitted from the at least one light source and reflected by at least one of the moving objects and the moving object background, and for deriving a surface shape of the moving objects based on the calculated range profiles.

2. The arrangement of claim 1, wherein individual sensor elements of the at least two optical semiconductor sensor lines are randomly accessed.

3. The arrangement of claim 1, wherein the at least two optical semiconductor sensor lines are CMOS components and the controller determines distance values of the moving objects using light propagation delay measurements.

4. The arrangement of claim 1, wherein the at least one light source is comprised of a modulating laser diode.

5. The arrangement of claim 1, wherein the at least one light source is comprised of a plurality of light sources and wherein each of the plurality of light sources respectively illuminates a portion of the moving objects.

6. The arrangement of claim 1, wherein the at least two optical semiconductor sensor lines are arranged perpendicular to the travel direction of the moving objects.

7. The arrangement of claim 1, wherein the at least two optical semiconductor sensor lines are arranged above the moving objects.

8. The arrangement of claim 1, wherein the at least two optical semiconductor sensor lines are arranged lateral to the moving objects.

9. The arrangement of claim 1, wherein respective coverage areas of the at least two optical semiconductor sensor lines are spaced approximately one meter apart.

10. The arrangement of claim 1, wherein corresponding coverage area of each of the at least two optical semiconductor sensor lines covers an entire width of a travel lane in which the moving objects travel.

11. The arrangement of claim 1, wherein the at least one light source is configured to illuminate a line on the moving object background having a width in the range of one to two centimeters.

12. The arrangement of claim 1, wherein the measured duration of light emitted from the at least one light source and reflected by at least one of the moving objects and moving objects background to the plurality of sensor elements include measuring at least one of a light pulse duration, short-time integrations and phase.

13. The arrangement of claim 12, wherein each of the plurality of sensor elements is comprised of two electrically separated element areas having light sensitive surfaces that are meshed with one another in order to accomplish short-time integration.

14. The arrangement of claim 1, wherein the speed and surface shape of a vehicle is determined.

15. The arrangement of claim 1, wherein the controller is configured to determine the surface shape of the moving object by including comparing a first calculated range profile of the moving object background where no moving object is present to at least one subsequently calculated range profile of the moving object as the moving object travels across the moving object background and determining at least one cross-sectional profile based on a difference between the first calculated range profile and at least one subsequently calculated range profile.

16. A method for determining at least one of speed and surface shape of moving objects based on measurements of the travel time of light emitted from a light source and reflected by the moving objects, comprising the steps of:

emitting at least one light pulse from at least one light source;

sensing light of the at least one light pulse that is reflected from one of a moving object or a moving object background across which the moving object travels using at least two optical semiconductor sensor lines positioned in a region of the at least one light source, the at least two optical semiconductor lines each being comprised of a plurality of sensor elements;

measuring travel time and intensity of light emitted from the at least one light source and reflected by at least one of the moving objects and the moving object background;

calculating range profiles of the at least one moving object based on measured travel time and intensity of light emitted from the at least one light source and reflected by at least one of the moving objects and the moving object background; and comparing a first calculated range profile of the moving object background where no moving object is present to at least one subsequently calculated range profile of the moving object as it travels across the moving object background and determining at least one cross-sectional profile based on a difference between the first calculated range profile and at least one subsequently calculated range profile.

17. The method according to claim 16, wherein an area of a corresponding cross-section is determined by integration of the cross-sectional profile.

18. The method according to claim 17, wherein the integration of the cross-sectional profile includes summing all of the respective differences between the first calculated range profile and the at least one subsequently calculated range profile of the moving object as the moving object travels across the moving object background.

19. The method according to claim 17, wherein a longitudinal profile of the moving object is determined based on a sequence of a plurality of determined cross-sectional areas.

20. The method according to claim 17, further comprising the steps of:

determining a shape of the moving object based on a plurality of determined cross-sectional profiles and a longitudinal profile; and classifying the moving objects into at least one of a plurality of categories based on the determined shape.

21. The method according to claim 20, wherein the plurality of categories includes a person, a motorcycle, a passenger vehicle and a truck.

22. The method according to claim 16, wherein two different short-time integrations having respective different integration times are implemented to a same object location for measuring the travel time of the light.

23. The method according to claim 22, wherein the two different short-time integrations occur for a same surface area on the basis of one of two interlocking element areas of each corresponding sensor element.

24. An arrangement for measuring at least one of a speed and a surface shape of moving objects based on measurements of travel time and intensity of light emitted from a light source and reflected by the moving objects, comprising:

at least one light source configured to illuminate moving objects with light pulses;

at least two optical semiconductor sensor lines positioned in a region of the at least one light source, the at least two optical semiconductor lines each being comprised of a plurality of sensor elements for sensing light emitted from the at least one light source that is reflected by the moving objects and a moving objects background across which the moving objects travel, the at least two optical semiconductor sensor lines being spaced a predetermined distance relative to one another and disposed parallel to one another, and arranged transverse to a travel direction of the moving objects; and a controller for calculating range profiles of the moving objects based on measured travel time and intensity of light emitted from the at least one light source and reflected by the moving objects, and for deriving a surface shape of the moving objects based on the calculated range profiles.

* * * * *